United States Patent [19]
McGough

[11] Patent Number: 6,002,769
[45] Date of Patent: Dec. 14, 1999

[54] METHOD AND SYSTEM FOR PERFORMING SECURE ELECTRONIC MESSAGING

[75] Inventor: Paul McGough, Centreville, Va.

[73] Assignee: Secure Choice LLC, Chantilly, Va.

[21] Appl. No.: 08/923,095

[22] Filed: Sep. 4, 1997

Related U.S. Application Data

[63] Continuation-in-part of application No. 08/879,708, Jun. 20, 1997.
[51] Int. Cl.$^6$ ....................................................... H04L 9/28
[52] U.S. Cl. ................................. 380/28; 380/42; 380/45
[58] Field of Search ................................... 380/28, 42, 45

[56] References Cited

U.S. PATENT DOCUMENTS

| | | | |
|---|---|---|---|
| 4,068,089 | 1/1978 | Kuhnlein et al. | 178/22 |
| 4,087,626 | 5/1978 | Brader | 178/22 |
| 4,133,973 | 1/1979 | Branscome et al. | 178/22 |
| 4,195,196 | 3/1980 | Feistel | 178/22 |
| 4,333,090 | 6/1982 | Hirsch | 395/365 |
| 4,479,112 | 10/1984 | Hirsch | 340/365 |
| 4,675,477 | 6/1987 | Thornwall | 380/21 |
| 5,796,832 | 8/1998 | Kawan | 380/24 |

OTHER PUBLICATIONS

Millikin, D.D.: *Elementary Cryptography and Cryptanalysis,* (1943), pp. 88–90, Aegean Park Press.

*Primary Examiner*—Gail O. Hayes
*Assistant Examiner*—Ho S. Song
*Attorney, Agent, or Firm*—Mayer, Fortkort & Williams LLC; Michael P. Fortkort

[57] ABSTRACT

A secure electronic messaging system (SEMS) provides absolute system security and user-defined message security for electronic messaging between two public entities. These messages can be of any kind provided the contents are created using a defined master alphabet of 81 characters or less. The SEMS encrypts and decrypts source message data using a series of message keys that are derived from a private, numeric original key known only by both parties sending and receiving messages. The message key suite absolutely secures the original key from discovery. The secure distribution of these original keys will be under the same methods that the public entities would use to discover each other such as opening an account, making a public inquiry for membership, etc. The system is based on the simple mathematics for secure electronic monetary transactions that translates source numbers into encrypted cipher numbers. The SEMS translates message content characters into numbers based on a message key suite dependent distribution of the master alphabet and then uses a series of equations to encrypt the numbers. The formulas return every possible number value, except the input value, and are completely dependent on the message key suite. Because there are no hidden parts, the architecture of the SEMS is completely available to anyone in the public sector. This openness makes attempting message decryption worthless. The only way to break an individual message is to attempt all user-defined message key possibilities, and even if successful, the original key can not be derived or discovered. The only way to get the key is to physically steal it; which is the constant risk entailed in secure messaging. The total openness and absolute security delivered by the SEMS is what is missing in all other available secure messaging schemes, and it is what is required by the public to have complete confidence in electronic messaging and commerce.

37 Claims, 1 Drawing Sheet

METHOD AND SYSTEM FOR PERFORMING SECURE ELECTRONIC MESSAGING

RELATED APPLICATIONS

This application is a continuation-in-part of U.S. patent application Ser. No. 08/879,708 filed on Jun. 20, 1997 by the same inventor, entitled "Method and System for Performing Secure Electronic Monetary Transactions," which is hereby incorporated by reference as if recited herein in its entirety, including the drawings.

BACKGROUND OF THE INVENTION

The present invention relates generally to methods and systems for performing secure electronic messaging, and more particularly to a method and system for performing secure electronic messaging between two public entities for any 81 or less character alphabet, to include any character that can be represented and transmitted electronically as unique and individual; e.g. the 26 English alphabet characters, foreign representations of those 26 characters, numbers, special characters such as "&" or "{", representations of a message space (" "), etc. where in total, there are 81 or less unique entries in the alphabet used to create a message content.

The present invention is based on, and extends, the above mentioned patent application for performing secure electronic monetary transactions. This extension allows for performing secure electronic messaging using a private numeric encryption key system identical to that of the monetary system. The mathematics and processes of the messaging system use the fundamental capability of the monetary system, but in distinct and separate manners maintaining the absolute security of the key for both sets of information.

Existing secure messaging systems include private and public key encryption systems. These types of systems rely on creating sufficiently large codewords such that the time required to break the code by simply trying all possibilities ("brute force" decryption) is extremely large.

Securing a message transfer between two public entities can be done in a variety of ways. But no matter the manner chosen, the goal is to positively transfer the message contents through the public sector without the contents being discovered and used or read by anyone other than the intended recipient. This need for positive and secure messaging increases significantly along with the value of the information being passed. Various systems have been developed through the years to perform messaging and the public record is well documented with both success and failure. The major component of almost every system developed is an encryption key that is used to translate information from source text to cipher text and back to source text.

A message content key is just like a physical one—it is used to unlock or, in this case, secure data. All modem secure systems use keys of one type or another. The only difference between a message key and a physical one is that besides losing it or having it stolen, it can also be derived ("broken") or discovered. The major weakness with public transfer of information is key discovery. Not the physical issues with loss or theft, which are faults that cannot be removed from any key-based system but deriving and using a key without authorization.

The current electronic age has ushered in a dramatic increase in the need for secure messaging, and new methodologies have been developed to attempt to meet the demand. The main new capability that has been unveiled is to use systems based on a concept called Public Key Encryption (PKE). These systems were developed to solve the supposed faults of the private key methods used in the past. A private key system is one in which only those who intend to share information will all posses the same key. The private key systems supposedly have a major fault: the secure distribution of the private key to the intended recipients and only to those recipients.

PKE introduced a concept in which there are dual keys—one public and one private. The public key is freely distributed to anyone who wishes to transfer information to the entity holding the single private key. This dual key approach therefore solves the fault by not having to distribute a private key. The entire basis for PKE methods are the mathematically large disparity between decrypting the public key created cipher text with the PKE private key, which is very rapid and simple to do (polynomial time computation), and working through the possibilities without the key, which theoretically takes a very long time (factoring, requiring exponential time computation). The systems are theoretically secure because the combination of the public key and the source information generate this theoretically long time to factor the possibilities without the PKE private key. The reason this is theoretical is that it is possible to develop a unique set of mathematical equations or even a single algorithm for either mimicking or rapidly factoring an integer in polynomial time, although no solution has been published to date. Alternatively, faster computers are always shortening the problem. Proposals have even been made to develop "quantum computers" that would perform these computations in a fraction of the expected time. Consequently, the controversial issue with these methods is that if the math were to be developed, or the shortcut found, then the security of these PKE systems completely and instantly evaporates.

The fundamental problem with these PKE systems is that they have been introduced as saviors of the faults of a private key system; and while supposedly solving this problem, they have introduced uncertainty into the core issue with all encryption systems: unauthorized discovery of the key—now matter how sophisticated the mathematics.

In relation to securing language-based message contents, the PKE systems have several major flaws:

1. The mathematics of the systems can be broken instantly by the theoretical development of algorithms for factoring large relatively prime numbers, which PKE is based on; e.g., message decryption is not solely dependent on "brute force" attempts of every possible key combination;
2. The derivation of a single message key reveals the private key for all messages sent using the corresponding public key, e.g., once the key is discovered, and the discovery kept secret, all messages being sent with a key set can be broken and read;
3. The PKE systems do not account for the single most important factor in secure messaging—authentication, of both the message's sender and the content condition (touched/untouched); e.g., the major benefit of using PKE is to not have any concern for the public distribution of the keys. Yet because the system cannot in and of itself perform any authentication (all send using the same public key), secure messaging using these systems then requires the additional use of another external system to perform the authentication which completely negates the use of PKE for secure messaging.

The present invention is therefore directed to the problem of developing a system for performing secure messaging that does not rely on complicated mathematics that can negate key attempts, separates key discovery from message discovery making even key attempts valueless, provides content and sender authentication, and uses a completely open architecture.

SUMMARY OF THE INVENTION

The present invention solves these problems by providing a secure message contents system that employs the fundamental mathematics of the related Secure Electronic Monetary Transaction System (SEMTS) invention in a new series of simple mathematics and software processes that create an individual and unique, twice-derived numeric message key; a key-based offset for the alphabet resolution; a key-based offset for the encrypted message content start; a key-based offset for inserting random message content obscuring characters, and a numeric "digital signature" for authentication of message content and sender verification—all from a single, securely distributed "original" numeric key that is impossible to obtain or derive through decryption—of a single, or set, of messages.

To decode a particular message, one must know the alphabet offset, the random content offset, the random content obscuring insertion offset and the twice- derived numeric message key used to encode the content; these are all derived from an "original" securely distributed key that cannot be obtained from the message. Therefore, in order to "break" anything in the system, the only method available is a "brute force" attack on a single message. This attack would reveal, after an extremely long time period, that singular derived message key and the contents only. All other messages sent by the system using that original key are still one hundred percent secure and appear to any decryption effort as completely "new key" messages.

The system can be set so that the derived message key is of sufficient length to always guarantee a minimal "brute-force" attack time length to be measured in years—no matter the current technology; and the system guarantees that any "brute-force" attack will deliver only the derived message key, not the original key, and hence, only the content of the individual target message. The system guarantees a mathematical and process impossibility of ever discovering or deriving the original key from the message key, therefore making the only attack point of the system of no value.

The reason there is even one attack point, a "brute-force" message key attack, is due to the inherent nature of message contents: known language alphabets. Any and every message content will eventually deliver a grammatically correct language message if, when decoding, one exhausts every possible combination of key types and content. One doesn't have to know what to look for other than language that makes grammatical sense. The related system, the SEMTS, provides for no attack points because it is based on securing digits, which have no known "grammar" to use for testing a possible decode outcome. Therefore, when using this invention to secure a message, and embedding an SEMTS encrypted financial transaction using an SEMTS "ideal" key, the combined system completely secures and facilitates open electronic commerce.

Used alone, this invention delivers better "brute-force" security than the PKE systems by a user-defined magnitude, and completely limits "breaking the code" to the content of a singular message from a singular sender—every other message from that same sender using the same key are completely unrelated to the "break" of any one individual message.

The system of the present invention uses the SEMTS invention's nine mathematical formulas and two software code processes, along with three new software code processes and one simple addition formula to accomplish encryption and decryption composed of an 81 unique character alphabetical message of any content length.

In order to use the system, step one is to establish the length of the private numeric key to be shared between the two public message entities. This length should be substantial enough to generate as true a random set of numbers for the key as manageable under the planned use by the two entities. There is no system minimal length, but it should be at least enough digits so that attempting all keys against a message is unreasonable. This is the "user-defined" value for determining the minimum "brute-force" attack period.

(An example of this is that if the current technology can generate an average attack test scenario of one billion keys per second against a particular message, and the requirements of the system are to have the minimal average "break" time of one year for any one message, then the "original" key length should be set at 128 numeric characters. This is because there would be approximately $3.15 \times 10^{16}$ attempts in a year; and if on average a message is "broken" after 50% of the keys are attempted, the goal would be to have the message withstand approximately $1 \times 10^{32}$ attempts. Then this key should generate at least $1 \times 10^{64}$ possible key attempts in order to have $1 \times 10^{32}$ be 50% of the total. And using this present inventions system, that would be an "original" key of 128 digits; because using this system, the original key produces a message key of one half its length; therefore the resulting derived message key from a 128 digit original key would be 64 digits long, producing $1 \times 10^{64}$ possible keys.).

The next step is secure external distribution of the keys. Finally, the system of the present invention can be used to send content messages between the parties based on the distributed original keys.

The present invention provides a completely open messaging architecture between two public entities to accommodate and incorporate the true dynamics and purpose of secure messaging. The purpose is not to absolutely secure just one single message—if it were, then hand deliver it. The purpose and value of secure messaging is in the system as a whole; in using a system that delivers group message security that is unbreakable, and singular message security that is predictable and makes for an unreasonable effort to obtain and attack it.

No system to date has met the real goal of secure messaging: to make captured or stolen content messages have no value—they can only be derived from a "brute-force" key attack of impossibly long expenditures of time and effort which would then reveal only that content, not any others. The present invention meets that goal; and if the system is used to encrypt financial commerce messages that will contain SEMTS further encrypted monetary information that cannot be discovered, a key attack has no meaning at all.

In addition, the present invention has no new mathematical system; it uses the related SEMTS simple mathematical foundation that provides confidence and straightforward comprehension of the method—no theory is involved. The additional mathematics in the present invention is the simple addition of two single digit numbers.

The system also delivers message content and sender authentication, which is not found in any other secure electronic messaging system. Finally, the present invention makes the system small and self-contained so that it can be delivered easily to any institution wishing to incorporate the system into their messaging systems.

According to the present invention, a method for encrypting a message includes the steps of calculating a numerical value corresponding to each digit of a source key by using each digit of the source key as an input variable to one of a plurality of formulae, thereby creating a message key, selecting the one of the plurality of formulae based on a corresponding digit of a random key, and distributing an alphabet of characters throughout a predetermined matrix for each individual message based on the message key.

One advantageous embodiment of the method of the present invention for distributing the alphabet includes the steps of: (i) determining an order fill pattern for the alphabet; (ii) determining a start position of an alphabet fill in the matrix from two predetermined digits of the message key; (iii) determining a start position of a blank fill from two additional predetermined digits of the message key; (iv) determining a blank separation value from two more predetermined digits of the message key; (v) determining a blank grouping value from two further predetermined digits of the message key; (vi) designating a plurality of blank positions in the matrix starting at a position in the matrix equal to a modular sum of the start position of the alphabet fill plus the start position of the blank fill, continuing for a number of positions in the matrix equal to the blank grouping value, and then skipping a number of positions in the matrix equal to the blank grouping value; and (vii) distributing the alphabet in the matrix by starting at the start position of the alphabet fill and filling all positions not designated as blank positions according to the order fill pattern.

To generate the random key, the method of the present invention further includes the steps of calculating a numerical value corresponding to each digit of the source key by using each digit of the source key as an input variable to one of a plurality of formulae, thereby creating the random key, and selecting the one of the plurality of formulae based on a second digit of the source key that is cyclically offset from each digit in accordance with a random number.

In this case, a further advantageous embodiment of the method of the present invention for selecting the one of the plurality of formulae includes the steps of: (i) using a digit of the random number corresponding to each digit of the source key to determine a cyclical positional offset from each digit of the source key; (ii) determining the second digit of the source key by cyclically moving a number of digits from each digit of the source key in accordance with the cyclical positional offset; and (iii) selecting another one of the plurality of formulae based on a third digit of the source key that is offset from the second digit of the source key by a predetermined amount if the one of the plurality of formulae returns a value of zero.

To develop the encrypted message, the method of the present invention further includes the steps of calculating a numerical value corresponding to each character of the message by cyclically using a corresponding digit of the message key as an input variable to one of a plurality of formulae, thereby creating an encrypted message, and selecting the one of the plurality of formulae based on a location in the matrix in which each character is stored.

Another embodiment of the present invention for developing the encrypted message includes the steps of calculating two numerical values corresponding to each character of the message by cyclically using two corresponding digits of the message key as input variables to a first one of a plurality of formulae and a second one of the plurality of formulae, respectively, thereby creating an encrypted message, selecting the first one of the plurality of formulae based on a column in the matrix in which each character is stored and selecting the second one of the plurality of formulae based on a row in the matrix in which each character is stored.

To generate the source key, the method of the present invention further includes the step of modular summing pairs of digits of an original key according to a random number assignment of the pairs of digits of the original key to produce the source key, which has a length less than that of the original key.

In this case, an advantageous embodiment of the method of the present invention for performing the modular summing includes the steps of: (i) pairing a first digit of the original key with a second digit of the original key, wherein the second digit is offset from the first digit by a first cyclical offset amount; (ii) determining a first cyclical offset amount based on a digit of the random number corresponding in position to a position of the first digit; and (iii) selecting a next unused digit in the original key if the second digit paired in step (i) has already been paired with another digit of the original key.

Another advantageous embodiment of the method of the present invention further includes the steps of determining a number n by selecting predetermined digits of the source key, and inserting a plurality n of false characters at a beginning of the encrypted message for each message.

Yet another advantageous embodiment of the method of the present invention further includes the step of interspersing a plurality of false characters throughout the encrypted message.

In this case, a particularly advantageous embodiment of the method of the present invention further includes the step of determining a starting position, a separation value and a grouping value of the false characters using predetermined digits of the source key.

Another advantageous embodiment of the method of the present invention includes the step of appending an encrypted digital signature to each encrypted message that is completely unique and individual for each message that authenticates both a sender and content of the message as genuine.

In this case, the method of the present invention includes the step of determining a digital signature based on manipulating digits of the encrypted message in accordance with a predetermined algorithm.

According to the present invention, one possible embodiment for the predetermined algorithm includes the steps of: (i) summing all position values for each integer from zero through nine used in the encrypted message; (ii) concatenating a resulting sum for each integer in order according to an order in which each integer first appears in a random number; and (iii) using a lowest to highest ordering for those integers that do not appear at all in the random number.

According to the present invention, one particularly advantageous embodiment of the method of the present invention for encrypting the digital signature includes the steps of encrypting each digit of the digital signature by cyclically using each digit of the source key as an input variable to one of a plurality of formulae, and selecting the one of the plurality of formulae in accordance with a location of each digit of the digital signature in the matrix.

According to the present invention, another particularly advantageous embodiment of the method of the present invention for encrypting the digital signature includes the steps of encrypting each digit of the digital signature by cyclically using two digits of the source key as input variables to a first one of a plurality of formulae and a second one of a plurality of formulae, respectively, selecting the first one of the plurality of formulae in accordance with a column in the matrix in which each digit of the digital signature is located, and selecting the second one of the plurality of formulae in accordance with a row in the matrix in which each digit of the digital signature is located.

According to the present invention, one possible embodiment for encrypting the random number includes the steps of encrypting each digit of the random number by using each digit of the random number as an input variable to one of a plurality of formulae, selecting the one of the plurality of formulae in accordance with a cyclically corresponding digit of a base source key, and transmitting the encrypted random number as part of the encrypted message.

In this case, one possible embodiment for selecting the one of the plurality of formulae includes the steps of: (i) inserting a random digit in the encrypted random number when cyclically corresponding digit of the base source key equals zero; and (ii) using a next digit in the base source key to select the one of the plurality of formulae when the cyclically corresponding digit of the base source key equals zero.

According to the present invention, one possible embodiment of the method of the present invention for generating the base source key includes the steps of pairing predetermined digits of the original key, and modular summing the paired digits of the original key to obtain the base source key.

According to the present invention, a secure electronic messaging system includes the steps of: a) assigning to two distinct public entities, two identical original symmetric numeric keys of length n where n is an even number and of set length so that $1 \times 10^{n/2}$ is a substantial and agreed upon number; b) using a random number to assign and sum the digits of the original key by a formula that produces a source key one half a length of the original key; c) using a formula to assign and sum the digits of the original key as they appear in order in pairs to produce a base source key that is one half the length of the original key; d) using a plurality of formulae and the base source key to encrypt the random number and add a resulting encrypted random number to a message contents; e) using a first formula to sum a plurality of digits of the source key to generate a random key; f) using a plurality of formulae to generate a unique and individual message key from the random key and the source key; g) distributing up to an 81 character master alphabet into a 9 by 9 segment matrix uniquely for each individual message based on the message key; h) distributing an offset of a plurality of false characters uniquely for each message based on the source key and adding these to the message contents; i) encrypting the original message while distributing interspersed false characters by using a plurality of formulae and based on the message and source keys; j) using a second formula to create a message signature that is completely unique and individual for each message that authenticates both the sender and the content of the message as genuine; k) encrypting the message signature by a plurality of formulae and adding it to the message contents; and l) formatting for open public transmission a resulting total encrypted message including the encrypted random number, the false character offset, the message content with interspersed false characters and the message signature to be plain ASCII text consisting of two strings of numbers separated by a carriage return and line feed.

Furthermore, according to the present invention, a method for decrypting an encrypted message includes the steps of using a message key to uniquely distribute an alphabet into a matrix for the encrypted message, determining a location value of a character in the matrix by using a digit of the message key as an input variable to a plurality of formulae, and using a corresponding digit of the encrypted message as a return value of the plurality of formulae, thereby identifying which one of the plurality of formulae was used to generate the corresponding digit of the encrypted message, wherein a numerical order of the one of the plurality of formulae represents the location value, and outputting a character in the matrix at the location value previously determined, thereby outputting a decrypted message.

In this case, according to the method of the present invention, one possible embodiment for using the message key to uniquely distribute the alphabet includes the steps of: (i) using a predetermined order fill pattern for the alphabet; (ii) determining a start position of an alphabet fill in the matrix from two predetermined digits of the message key; (iii) determining a start position of a blank fill from two additional predetermined digits of the message key; (iv) determining a blank separation value from two more predetermined digits of the message key; (v) determining a blank grouping value from two further predetermined digits of the message key; (vi) designating a plurality of blank positions in the matrix starting at a position in the matrix equal to a modular sum of the start position of the alphabet fill plus the start position of the blank fill, continuing for a number of positions in the matrix equal to the blank grouping value, and then skipping a number of positions in the matrix equal to the blank grouping value; and (vii) distributing the alphabet in the matrix by starting at the start position of the alphabet fill and filling all positions not designated as blank positions according to the order fill pattern.

According to the method of the present invention, one possible embodiment for determining the location value first determines a column value of the character in the matrix by using a first digit of the message key as an input variable to a plurality of formulae, and using a first corresponding digit of the encrypted message as a return value of the plurality of formulae, thereby identifying which one of the plurality of formulae was used to generate the first corresponding digit of the encrypted message, wherein a numerical order of the one of the plurality of formulae represents the column value. Then, this embodiment determines a row value of the character in the matrix by using a second digit of the message key as an input variable to a plurality of formulae, and using a second corresponding digit of the encrypted message as a return value of the plurality of formulae, thereby identifying which one of the plurality of formulae was used to generate the second corresponding digit of the encrypted message, wherein a numerical order of the one of the plurality of formulae represents the column value.

According to the method of the present invention, during the decryption process the message key is generated from the encrypted message and an original key.

One possible embodiment for generating the message key during the decryption process includes the steps of calculating a numerical value corresponding to each digit of a source key using each digit of the source key as an input variable to one of a plurality of formulae, thereby creating the message key, and selecting the one of the plurality of formulae based on a corresponding digit of a random key.

According to the method of the present invention, one embodiment for generating the random key during the decryption process includes the steps of calculating a numerical value corresponding to each digit of the source key by using each digit of the source key as an input variable to one of a plurality of formulae, thereby creating the random key, and selecting the one of the plurality of formulae based on a digit of the source key that is offset from each digit in accordance with a random number.

According to the method of the present invention, one embodiment for generating the base source key during the decryption process includes the steps of summing pairs of digits of the original key according to a predetermined assignment of the pairs of digits of the original key to produce a base source key, which has a length less than that of the original key, using each digit of the base source key as an input variable to one of a plurality of formulae, using a corresponding predetermined digit in a predetermined location within the encrypted message as a return value from the plurality of formulae for each digit of the base source key, thereby identifying which one of the plurality of formulae was used to generate the corresponding predetermined digit, and determining each digit of the random number from a formula number corresponding to the one of the plurality of formulae that was used to generate the corresponding predetermined digit.

According to the method of the present invention, one embodiment for generating the source key during the decryption process includes the steps of generating the source key by summing pairs of digits of the original key based on pair assignments obtained in a predetermined manner from a random number.

According to the method of the present invention, one embodiment for generating the random key during the decryption process includes the steps of generating each digit of the random key by using each digit of the source key as an input variable to one of a plurality of formulae, and selecting the one of the plurality of formulae based a first offset digit of the source key that is offset from each digit of the source key in accordance with a predetermined digit of the random number.

In this case, one particularly advantageous embodiment for selecting the formula includes selecting another one of the plurality of formulae based on a second offset digit of the source key that is offset from the first offset digit of the source key by a predetermined amount of digits if the one of the plurality of formulae in step g) returns a value of zero.

Another advantageous embodiment of the method of the present invention for decrypting an encrypted message includes the steps of determining a number n by selecting predetermined digits of the source key, and discarding a plurality n of false characters at a beginning of the encrypted message for each message.

Another advantageous embodiment of the method of the present invention for decrypting a message includes the step of discarding a plurality of false characters interspersed throughout the encrypted message.

In this case, one particularly advantageous embodiment of the method of the present invention includes the step of determining a starting position, a separation value and a grouping value of the plurality of false characters using predetermined digits of the source key.

Another advantageous embodiment of the method of the present invention includes the step of checking an encrypted digital signature appended to each encrypted message to determine if the message is authentic during the decryption process.

Another advantageous embodiment of the method of the present invention for decrypting each digit of the encrypted digital signature to obtain a decrypted digital signature includes the steps of: (i) using a corresponding digit of a source key as an input variable to a plurality of formulae; (ii) using each digit of the encrypted digital signature as a return value of the plurality of formulae, thereby identifying which one of the plurality of formulae was used to generate each digit of the encrypted digital signature; (iii) using a numerical order of the one of the plurality of formulae identified in step (ii) as a location value in the matrix; and (iv) outputting a character stored in the location in the matrix.

Another advantageous embodiment of the method of the present invention for decrypting the encrypted digital signature by decrypting each pair of digits of the encrypted digital signature includes the steps of: (i) using two corresponding digits of a source key as input variables to a plurality of formulae; (ii) using a first digit of each pair of digits of the encrypted digital signature as a first return value of the plurality of formulae, thereby identifying a first one of the plurality of formulae that was used to generate the first digit of each pair of digits of the encrypted digital signature; (iii) using a numerical order of the first one of the plurality of formulae identified in step (ii) as a row value in the matrix; (iv) using a second digit of each pair of digits of the encrypted digital signature as a second return value of the plurality of formulae, thereby identifying a second one of the plurality of formulae that was used to generate the second digit of each pair of digits of the encrypted digital signature; (v) using a numerical order of the second one of the plurality of formulae identified in step (iii) as a column value in the matrix; and (vi) outputting a character located at a column and a row of the matrix according to the column and row values, respectively.

Another advantageous embodiment of the method of the present invention includes the steps of manipulating digits of the encrypted digital message in accordance with a predetermined algorithm to obtain a recipient generated digital signature, and comparing the recipient generated digital signature with the decrypted digital signature.

In this case, one particularly advantageous embodiment of the predetermined algorithm includes the steps of: (i) summing all position values for each integer from zero through nine used in the encrypted message; (ii) concatenating a resulting sum for each integer in order according to an order in which each integer first appears in a random number; and (iii) using a lowest to highest ordering for those integers that do not appear at all in the random number.

DETAILED DESCRIPTION

Figure 1:
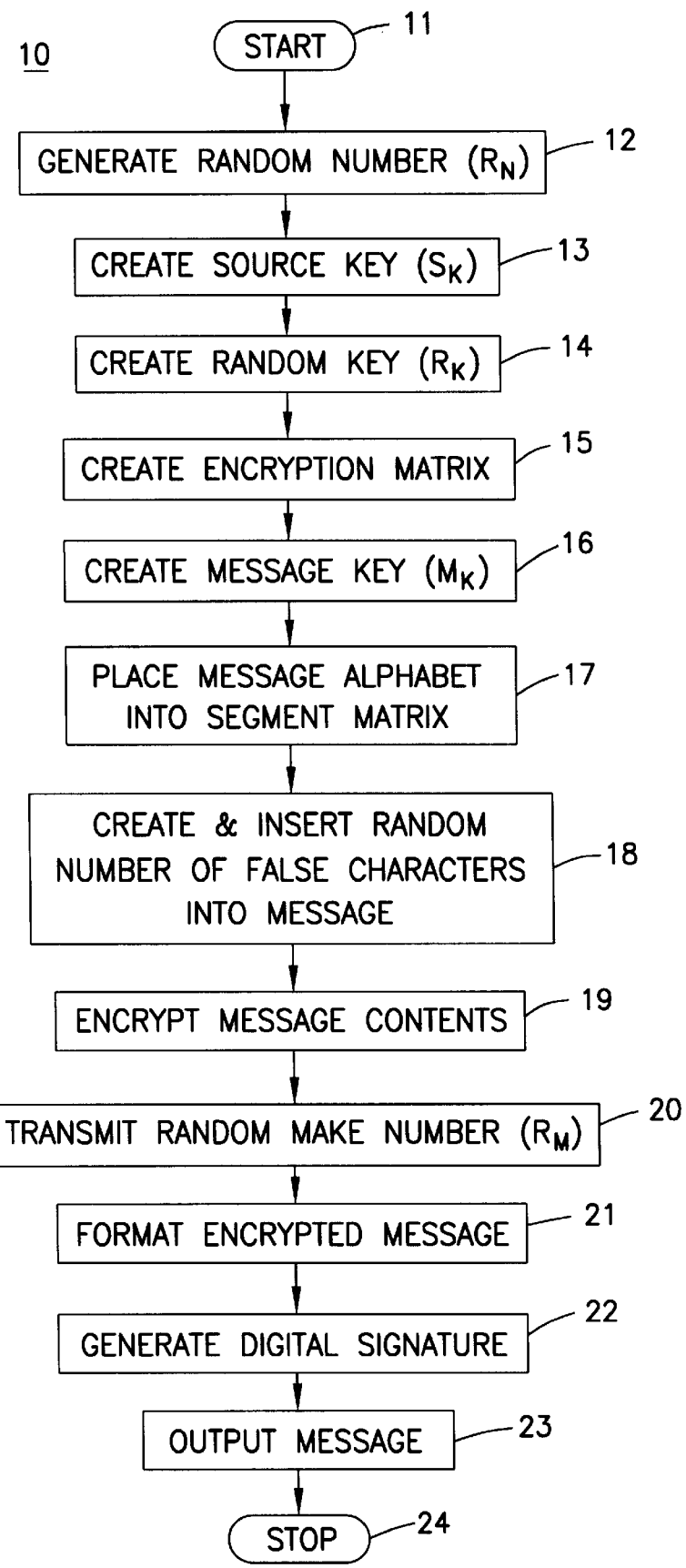
FIG. 1 depicts a flow chart of the method of the present invention for encrypting a message.

In order to uncover a system of truly unique and complete secure messaging, it is crucial to understand and accept a single concept: all encrypted language-based content messages can eventually be revealed without knowing the key system used to secure it or anything about the content structure and composition. This is due to the inherent nature of message contents: known language alphabets. No matter the system or the key, it will always reveal itself and therefore the message, because the content is language based. And the rules of a language are well known and documented. If enough time and effort is expended in attempting every possible key set for every possible system, eventually the message will be revealed by searching for the known language rules.

The real goal then, of a completely secure messaging system is not to guarantee every single message's encrypted integrity, but rather to guarantee all messages are secure. The measure of a secure messaging system is to deliver each message as if it were individually encrypted so that the system cannot be attacked, and for each individual encrypted message to be so difficult to decipher as to make it a completely worthless endeavor to try.

Understanding the concept and goals of a secure messaging system is paramount to meeting the major goal of encryption—making key derivation impossible. So in combining the purpose of securing messages with the goal of encryption, the best possible outcome of a secure messaging system is to provide an impossible to derive system or original key, and an individual message key that can be broken only by applying a tremendous amount of time and effort through a "brute-force" key trial attacks, and then having the message key not lead to the original key. The present invention is the first secure messaging system to deliver on this "best of breed" scenario.

And because it is the first system that has combined both aspects of authentication, sender and content, the present invention delivers on another crucial secure electronic messaging criteria—an open architecture. There is a complete lack of user faith in all aspects of secure messaging when the systems require more and more complicated delivery mechanisms—protocols, firmware, hardware, etc. An open architecture delivers the system value directly to the user. There is no fear in using a system that can be stolen but never is because the stolen goods have no value. The openness of the system creates user confidence and allows the focus of the system to be in the physical aspects—key distribution, key theft, software authentication, etc. These are the constants in any secure messaging system, and the present invention finally transfers the burden of absolute security from the messages themselves back to physically operating the system.

The secure electronic messaging system (SEMS) of the present invention is designed to deliver complete, open architecture secure messaging through unbreakable original symmetric keys that produce an individual, unique message key for every message sent. The system uses private keys and the mathematics of the Secure Electronic Monetary Transaction System (SEMTS)—which is the subject of the parent patent application and which has already been incorporated by reference—for securing any n digit financial transaction. The original keys ($O_K$) used for the current system are identical to those in the SEMTS in that they are composed of numbers 0 through 9, have a minimum length determined by the two public entities using the system and that they are of even length; an example original key is "1830596874".

ENCRYPT MESSAGE PROCESS

The encryption process 10 of the present invention is depicted in FIG. 1, which process 10 begins in step 11 of FIG. 1.

Generate Random Number (12)

In order to send a secure message using the SEMS, the first process for every message, which is not a part of this patent, is to generate a random number that is the length of the original key. [There are several fine software algorithms for generating "true" random number sets. Even if these are not used, and a simple algorithm, such as taking a repetitive, changeable sample from the division result of the number one and a large prime number (e.g., 1/213), is still more than sufficient to produce a random enough number for the remainder of this invention's processes—this number does not need to approach "true" random in order to protect the number of "brute-force" key attempts.] This number, the message Random Make number ($R_m$), is used by the remainder of the message encryption process to determine various off-sets and number pairings.

Encrypt Message

The second process of the SEMS is to encrypt the message to be sent. This process includes various sub-processes, the first of which is translating the Original Key ($O_K$) into a Message Key ($M_K$) for every message to be sent. The Message Key ($M_K$) is a derivative of the Original Key, and its creation through the encryption process guarantees that it cannot lead to "reverse" discovery of the Original Key ($O_K$) through any mathematics—the only way to generate the Message Key ($M_K$) without the Original Key ($O_K$) is a brute force attack on the message. It must be remembered that by using the present invention, the system would be set so that the brute force attack on this singular message key is a meaningless endeavor. The SEMS encrypt process delivers absolute security of the Original Key ($O_K$) by translating it into a message key ($M_K$).

Combine Pairs of Digits of Original Key ($O_K$) To Produce Source Key ($S_K$) (13)

The key creation sub-process of the encrypt process starts by using simple addition to combine pairs of digits of the original key (digit pairs selected using $R_m$, see Example) to produce an intermediate Source Key ($S_K$) that is one half the original key length. From the same example original key, "1830596874", a possible message key would be "93441" (assuming a Random Make number $R_M$ of "11111"). The simple addition formula used to combine the digit pairs in this example is:

$$x+y \operatorname{MOD}(10)$$

where x is one of the original key digits, and y is another. When creating the Source Key ($S_K$), the original key digits x and y are never used more than once. In our example, the location of the xy pairs was digit 1 and digit 2, then digit 3 and digit 4, then digit 5 and 6, then 7 and 8, lastly digits 9 and 10. As you can see from the resulting message key, the numbers "5" and "9" (digit pairs 5 and 6) have the identical result number ("4") as do the numbers "6" and "8" (digit pairs 7 and 8). This is the beginning of the separation of the original key from the final message key, and why the original key cannot ever be derived from the message key.

This first derivative key, the Source Key ($S_K$) "93441", is made up of digits that are the result often (10) possible digit pairs that could have composed them; e.g., the "9" could result from 10 possible digit pairs—9+0, 8+1, 7+2, 6+3, 5+4, 4+5, 3+6, 2+7, 1+8, 0+9. Regardless of the other processing that will occur, this multiple parent digit trait already makes it impossible to positively identify the original key! That is, "93441" could have come from an original key "7212220465" using the same digit pairs (i.e., based on the same $R_M$) to generate a source key (7+2=9, 1+2=3, 2+2=4, 0+4=4, 6+5=1).

Using the formula for the source key derivation creates a standard distribution of ten possible pair numbers for every generated result digit; e.g. for the result digit "0", there are ten possible parent formula number pairs producing that result: 0 and 0, 1 and 9, 2 and 8, 3 and 7, 4 and 6, 5 and 5, 6 and 4, 7 and 3, 8 and 2, and lastly, 9 and 1. Then there are 10 possible parent pairs for the number "1", etc.

The difference in the digit pairs between 6 and 4, and 4 and 6, is that the location of the digits in the original key is significant in that each source key generated results from a random selection of the digits to make up the pairs. Having each source key digit result from ten possible digit pairs, and having the location changeable for each result makes it virtually impossible to determine the makeup of the original key from any source key and/or from any set or collection of source keys. One simply would have to guess the original key—all n digits of it!

Generate Random Key ($R_K$) (14)

Now that the original numeric key has been translated into a source numeric key, the next part of the key creation process is to generate a Random Key ($R_K$). This random key has one specific characteristic that must be met in order to provide a message key that will be able to use the SEMTS formula set to encrypt a message. This characteristic is that none of the Random Key ($R_K$) values can be a zero (0). This is due to the fact that for the remainder of this creation process, and the encryption, the present invention's SEMS will be using the SEMTS nine formula system for encrypting and translating one number into another. [The SEMTS has nine mathematical formulas that when one inputs a numeric into the set of formulas, the returned translated number could be any number, except itself These formulas result in a matrix of return values, based on the input into the system. The matrix is shown here for reference:]

| | SEMTS Encryption Matrix C | | | | | | | | | |
|---|---|---|---|---|---|---|---|---|---|---|
| Input value | 0 | 1 | 2 | 3 | 4 | 5 | 6 | 7 | 8 | 9 |
| Formula | | | | | Return Values | | | | | |
| #1 | 1 | 2 | 3 | 4 | 5 | 6 | 7 | 8 | 9 | 0 |
| #2 | 2 | 3 | 4 | 5 | 6 | 7 | 8 | 9 | 0 | 1 |
| #3 | 3 | 4 | 5 | 6 | 7 | 8 | 9 | 0 | 1 | 2 |
| #4 | 4 | 5 | 6 | 7 | 8 | 9 | 0 | 1 | 2 | 3 |
| #5 | 5 | 6 | 7 | 8 | 9 | 0 | 1 | 2 | 3 | 4 |
| #6 | 6 | 7 | 8 | 9 | 0 | 1 | 2 | 3 | 4 | 5 |
| #7 | 7 | 8 | 9 | 0 | 1 | 2 | 3 | 4 | 5 | 6 |
| #8 | 8 | 9 | 0 | 1 | 2 | 3 | 4 | 5 | 6 | 7 |
| #9 | 9 | 0 | 1 | 2 | 3 | 4 | 5 | 6 | 7 | 8 |

As one can see, the SEMTS system has input and formula values for translating numbers. The Random Key ($R_K$) will be used as the formula value, and since there are only nine formulas, the Random Key ($R_K$) cannot have a zero. (In the SEMTS, the key value is used as the formula value. When the key value (formula) is zero, then a random number is generated during encryption—and ignored during decryption. But this must be avoided in this invention's encryption process because the random number insertions would interrupt the trail between the Original Key ($O_K$) and the Message Key ($M_K$).

The Random Key ($R_K$) is produced by using the Source Key ($S_K$) digit values. The sub-process cycles through the Source Key ($S_K$) digit values starting at the first digit and using that as the SEMTS input value; and taking the xth digit of the Source Key ($S_K$) value for the formula, where x is determined by using the Random Make number ($R_M$). Continuing our example, the $S_K$ of "93441", cycled through a $R_M$ of "45018" and using the SEMTS encryption matrix would produce a $R_K$ of "86855".

This is determined by starting at digit one of the $S_K$ and using that value as the SEMTS encryption matrix input value, and using the first $R_M$ value as the offset for finding the $S_K$ value to use as the matrix formula; in this case the offset is a "4", and that means to use the value of "1" from the $S_K$. The offsets always move to the right in all SEMS encryptions, and they cycle back to the first digit if they fall off the "end" of the value used. When using the SEMTS encryption matrix for the input value of "9" and a formula value of "1", the return value is a "0" from the matrix.

Now since the output characteristic rule for the $R_K$ does not allow a result of "0", then the sub-process cycles to the next digit of the $R_M$ and repeats the matrix test. The next $R_M$ value is a "5", which cycles to the $S_K$ value of "9" (looping back around the value). The matrix result is an "8", and this is now the first value in the $R_K$. This sub-process continues for each $S_K$ digit value and always starts with the $R_M$ value that is in the same position. E.g., even though the $R_M$ value "5" was used by the first digit because its position value returned an invalid result, it is still the starting point for the next $S_K$ digit.

Creating of the Message Key ($M_K$) (16)

After successfully cycling through the $S_K$ for the complete generation of the $R_K$ then the encrypt process continues with the creation of the Message Key ($M_K$). This final message encryption key is created with one more pass through the SEMTS encryption matrix to further remove the real encryption key from the Original Key ($O_K$). Each digit of the $M_K$ is produced by using the corresponding position in the $S_K$ as the SEMTS input value and the $R_K$ as the formula (it is never zero). The $M_K$ is now twice removed from the $O_K$.

This positively guarantees that a discovered Message Key ($M_K$) cannot lead to the Original Key ($O_K$) because there are too many unknown variables and too few equations. Basically, even though these are position mathematics, and not real sum equations, the following still applies. After a message is "broken", and that message key is discovered:

$$O_K + R_M = S_K$$

$$S_K + R_M = R_K$$

$$S_K + R_K = M_K$$

where $M_K$ is the only known value, so there are four ($O_K$, $R_M$, $R_K$ and $S_K$) unknown variables with only three equations. This is mathematically impossible to solve; therefore there is no theory, shortcuts, algorithms or any other system to put in place to solve these equations and get back to the Original Key ($O_K$). (It should be noted that solving these in the "normal" mathematical sense is quite difficult anyway, because these are position equations—the result is both a value and a position in the key.) It is also obvious that without the Original Key ($O_K$), there is no way to attack the contents of the message other than brute force key attempts; and the key that would be discovered (after the tremendously long user defined period) is only that message key—no other discovery occurs or is enabled.

Placing the Message Alphabet into the Segment Matrix (17)

The next sub-process of the encrypt process for sending a secure message using the SEMS is to place the message alphabet into its Segment Matrix. The Segment Matrix is a 9 by 9 matrix that has 81 places for up to 81 unique characters, one of which will be set aside as a "Shift" character to differentiate upper and lower case letters (language dependent). The following is the matrix by position:

Segment Matrix by Position

| Column Segment | 1 | 2 | 3 | 4 | 5 Position | 6 | 7 | 8 | 9 |
|---|---|---|---|---|---|---|---|---|---|
| 1 | 1 | 2 | 3 | 4 | 5 | 6 | 7 | 8 | 9 |
| 2 | 10 | 11 | 12 | 13 | 14 | 15 | 16 | 17 | 18 |
| 3 | 19 | 20 | 21 | 22 | 23 | 24 | 25 | 26 | 27 |
| 4 | 28 | 29 | 30 | 31 | 32 | 33 | 34 | 35 | 36 |
| 5 | 37 | 38 | 39 | 40 | 41 | 42 | 43 | 44 | 45 |
| 6 | 46 | 47 | 48 | 49 | 50 | 51 | 52 | 53 | 54 |
| 7 | 55 | 56 | 57 | 58 | 59 | 60 | 61 | 62 | 63 |
| 8 | 64 | 65 | 66 | 67 | 68 | 69 | 70 | 71 | 72 |
| 9 | 73 | 74 | 75 | 76 | 77 | 78 | 79 | 80 | 81 |

For the English language, the total characters listed on the average machine keyboard is 68 characters and numbers. With the addition of a carriage return (CR), a line feed (LF), the space (" "), and the "Shift" key, this leaves 9 empty or blank positions. For any character set, if there are any blanks left over, these should be distributed into the Segment Matrix by start, separation and group values, which can all be set by picking random digits of the message key; e.g., in order to distribute 9 blanks, pick random digits of the key for where to start in the matrix, for how many positions to fill before the next blank (separation) and for how many spaces to group together on each interval. Then place the blanks at that interval.

The Segment Matrix alphabet distribution should be "fixed" in that for the entire messaging system (all parties sending/receiving like messages) the order in which the characters appears is fixed, but the position in the matrix can move. This adds even more difficulty to the brute-force attempts, in that now for every key attempt, there will be a minimum of 81 different alphabets to try (the fixed order starting in position 1, then in position 2, etc.). Depending on the number of blanks in the alphabet, the number of alphabets to try per attempt increases significantly. The formula for calculating the number of alphabets to try (and since this is an open system, it will be a known alphabet order and known number of blanks):

$$\frac{n!}{(n-m)! * (m-1)!}$$

where n=81 and m=(81—# of blank spaces)

As an example, for just five blank spaces, this can be a very large number—of which every possible combination must be attempted for each single key attempt.

There is an optimal distribution of the letters for every language, and it is an added benefit for an even distribution of those letters throughout the matrix. This enhances the uniform distribution of returns out of the matrix, and while not apparently statistically relevant to any brute-force key attempts, having the widest possible return distribution out of the matrix certainly is not a detriment.

The following is a sample order pattern to fill the matrix in a fairly even distribution for the English language (letters listed as capitals, but is either lower or upper case depending on the "shift" position):

Example Alphabet Order Segment Matrix

| Column Segment | 1 | 2 | 3 | 4 | 5 Position | 6 | 7 | 8 | 9 |
|---|---|---|---|---|---|---|---|---|---|
| 1 | E | \ | SP | ~ | C | Z | [ | | 2 |
| 2 | | % | J | < | 7 | - | # | T | ? |
| 3 | \| | K | + | Q | : | 3 | & | | N |
| 4 | , | " | B | / | R | shift | X | 4 | ` |
| 5 | ' | G | ! | O | 9 | W | | V | ) |
| 6 | $ | { | | ] | Y | | I | M | . |
| 7 | 1 | ; | 5 | P | > | A | | U | = |
| 8 | CR | LF | | C | | S | F | A | 6 |
| 9 | 8 | L | * | 0 | } | H | @ | | D |

(SP = space, CR = Carriage Return, LF = Line Feed)

Once the order fill pattern is decided for the system, then each message will generate a unique alphabet based on selecting two static digits from the message key that are less than or equal to 81, and the resulting number will be the start position of the Segment Matrix for that message. If there are blank positions in the matrix, then each message will select other static digits of the message key to use for distributing the blanks throughout the alphabet.

Create and Insert Random Number of False Characters Into Message (18)

So far in the SEMS encrypt process, the random make number has been generated, all of the message key values have been created, and the alphabet is distributed in the Segment Matrix. The next sub-process of the encrypt process is to create and insert a random number of false characters into the message at the start so as to create a non-uniform distribution of the beginning of the message, and disrupt the "grammar" rules for finding meaningful language.

The manner in which the SEMS performs this insertion is to pick two static digits from the Source Key ($S_K$). This will mean that anywhere from 0 to 99 false characters will be inserted at the message start to add to the difficulty of the brute force message key attempts. Adding another one hundred trials makes each key attempt that much slower and more difficult to perform. Every message content must now be tested using the same key starting at the n+z+1 digit of the encrypted message through the n+z+100 digit of the message (the first n digits are the Random Make digits ($R_M$) and this is a known system parameter; the z digits are unknown. The z digits are however many zero's are in the Random Make number ($R_M$). Each one will insert a random number into the encrypted Random Make number ($R_M$) making the start of the message an unknown.

Encrypt the Message Contents (19)

Now that the keys are ready, the alphabet distributed, and the message primed with false characters, the SEMS can encrypt the message contents. This sub-process makes it even more disruptive to find the "grammar" rules in the message. This is because the process will take static numbers from the Source Key ($S_K$) to insert false digits in a pattern into the encrypted message contents every x digits that are being stored. This means that even with the $M_K$ message key for the individual message, without the $S_K$ source key also, decryption is limited to the first x-1 characters. Unless one discards the correct inserted false characters, the remainder of the message will not properly decrypt! The brute force scenario for finding the $M_K$ message key has now been made much more difficult. Since the false characters are inserted with a start, group and separation value, every brute force key attempt must be checked against all of the possible start, group and separation permutations - making individual message decryption more and more difficult and less and less valuable.

The sub-process takes the message content one unique character at a time, finds it in the alphabet Segment Matrix, tests if it is a capital letter, and if so gets the "shift" matrix settings also. All of the Segment Matrix returns are two numbers—one is the segment number and the other is the column number.

Each individual number return is then encrypted through the SEMTS encryption matrix using the Message Key ($M_K$) First the "shift" matrix segment and column is sent if the character was a capital letter, then the segment and column of the character is sent. This is done cyclically through the $M_K$, one digit per number sent through the encryption matrix; e.g., to encrypt the capital letter "C" would take four digits from the $M_K$ message key—one for the "shift" segment, one for the "shift" column, one for the "C" segment and one for the "C" column. As the message characters are encrypted, a counter is kept that checks against the false number insert start, separation and group values to properly insert random digit numbers as false encrypted characters. These will be removed by the decryption process as insignificant, yet they wreck havoc on brute force attempts.

The resulting encrypted message content is roughly twice the size of the original content. This size increase should not be a problem in that the encrypted message result is plain text consisting of nothing but sequential numbers, and passing this through a compression algorithm prior to sending will relegate the message down to a very small size.

Transmission of the Random Make Number ($R_M$) (20)

The encrypt process is now complete for all the derived keys, the alphabet, the false priming of the message and the actual contents. The only number required for the recipient of the message to generate the same key set from the Original Key ($O_K$) and then decrypt the contents, is the Random Make number ($R_M$). If one does not have the original key, the only way to decrypt the message is to brute force attack the contents trying message key combinations. Even if successful, the only number obtained is the individual Message Key ($M_K$), which serves no further purpose beyond this one message. The Random Make number ($R_K$) determines where to point in all the keys for various offset items, and is used to determine the source key ($S_K$), and the random key ($R_K$), and indirectly, the final message key ($M_K$).

The Random Make number ($R_K$) has absolutely no meaning in decrypting the message without having the Original Key ($O_K$), therefore this number is sent as the first n characters of the message. The number is passed through the encryption matrix using a "base" Source Key ($S_K$)—a source key created using the digit order of the $O_K$. That process makes it twice removed ($O_K$ to "base" $S_K$ and then through the encryption matrix) and impossible to decipher in and of itself. The $R_M$ can then be passed along with the remainder of the message key encrypted contents. All of the key creations between one key definition to another are impossible to "break"—they are limited to a guess.

This is due to the "ideal key" presentation in the patent for the SEMTS. The quick explanation is that an "ideal key" is one which is at least as long as the content to be encrypted and can return all the same possible outcomes for every input. E.g., if encrypted content for a number is "444", it is impossible to "try" all the keys to get back to the source content number, because the source content has no "grammar". There is no frame of reference for what the source is, so one cannot attempt different keys to "see if they work."

An ideal key has translated every individual piece of the content into the same output. The source could be three identical digits, but it also might be any other digit too! (The SEMTS "ideal key" approach returns every other output digit other than the input value; so in this example, the only known thing is that the source number is not "444".)

In using this SEMTS "ideal key" approach for translating all number keys into other number keys, it is simply impossible to derive one key from the other—there is no frame of reference for any of the source content numbers.

Format of Encrypted Message (21)

The encrypt process now formats the encrypted message to contain the following:
1. Random Make number ($R_M$), encrypted using a "base" Source Key ($S_K$)
2. The n false characters generated using two digits of this message's Source Key ($S_K$), and encrypted using the Message Key ($M_K$)
3. The message contents encrypted using the Message Key ($M_K$)

Generate a Digital Signature for Each Message

The last sub-process of the encrypt process of the present invention is to generate a "Digital Signature" (DS) for each message. This DS is the authentication capability of the SEMS that is completely unique to the present invention and no other secure messaging system. All other systems must rely on external capability and systems to provide the two authentication areas—content and sender. The present invention offers both types of authentication in a single DS appended to each message.

Sender authentication is inherent in the symmetric key approach used by the present invention. There is simply no way to create a message that will decrypt through the Source Key, the Random Key and the Message Key using a Random Make number unless it is all created from the correct Original Key. One might guess all n digits of the $O_K$, and then send a message, but the odds of correctly guessing the key are astronomical, depending on the size of the $O_K$. Therefore, if a recipient receives a message that properly decrypts using the expected Original Key $O_K$ and the sent $R_M$ random make number, it must have been generated by the expected and proper sender. (It must be noted that from a physical use standpoint, no system can guarantee that the message was sent from the proper or expected place, only that it was created by the authorized sender's machine. The message could have been stolen, untouched, and then sent on. It also could have been fraudulently created in an unauthorized manner by physical intrusion onto the expected sender's machine, though not created by the real sender. Physical security, however, is outside the scope of this system and patent.)

Summing of Positions of Each of the Ten Digits in the Encrypted String

The manner in which the SEMS creates a DS for content authentication and appends it to the message is based on the numeric format of the encrypted contents. The content of the message is, so far in the process, an uninterrupted string of numbers—consisting of various things, but all concatenated together into one long list. The SEMS DS is created by summing the position of each of the ten digits in the string; e.g., in the string of numbers "180394827", the sum of the positions for the digit 8 is 2+7=9. The sum of the digit 4 is 6. The first step in the DS is to sum all of the position values for each of the ten digits. (If there are none, the sum is 0.)

The purpose of summing the positions is that they cannot now be touched. The SEMS is an open architecture system, so the string of numbers is sent unprotected into the public sector. But this openness provides a great measure of security in that the numbers cannot be manipulated at all or the sum of the positions will no longer be the same. If a digit is moved, altered or deleted, the sum of the positions changes. There is no way to add a "2" or change it to a "3" or remove it, without the position value sums being changed.

Order of Digits in the Digital Signature

Now since anyone can perform the same math on a message, the DS is "exposed" in that one could touch the message and correctly alter the DS. So the DS must be appended to the message in such a manner as to completely hide its content and exposure. The SEMS accomplishes this by first arranging the DS in a manner dictated by the non encrypted Random Make number $R_M$. The DS is concatenated together by the order of appearance of the digits in the $R_M$ random make number; e.g., if the first number of the $R_M$ random make number is an "8", then the first n characters of the DS is the summed number of the positions for the digit "8". The next piece of the DS is the next number appearing in the $R_M$ random make number. This is continued until all digits are found—and if they do not all exist in the $R_M$ random make number, then they are added from the lowest to highest number that is missing.

Encryption of the Digital Signature String

Once the DS string is now "ordered", it is ready to be encrypted and then appended to the message contents. In order to separate the DS from the remainder of the message, a carriage return and line feed are added to the existing encrypted contents. The DS is then appended to the message after sending each individual number through the encryption matrix as if it was a part of the message, but using the "base" Source Key $S_K$ instead of the Message Key $M_K$. The "base" Source Key $S_K$ is also used to encrypt the Random Make number $R_M$.

The reason for using the "base" $S_K$ is if the $M_K$ is discovered through brute force, and the DS was not uniquely encrypted, it would be possible to send false messages using that key by re-calculating the DS after forging a message and encrypting it using the cracked $M_K$. This also would lead to knowing the order of appearance of the digits in the Random Make number $R_M$, even though that is not the entirety of the number, nor even the correct beginning (there could three "8"s to start the number), this exposure can be avoided by using the "base" Source Key $S_K$.

The DS guarantees content authentication because if it does not resolve back to the correct position sum of the contents, then the message is considered invalid. If either the contents or the DS is touched, then they will no longer equate. And it is fantastically improbable to properly touch both the content and the DS and have them equate—even more impossibly to do that meaningfully.

Summary

The encrypt process is now complete, and the message is ready to send (24). It is a formatted, open text message of two long strings of numbers separated by a carriage return and line feed. It is secure in that the message contents are protected to the maximum possible extent of any language based message, authenticated for both sender and content, deliverable in an open, uncluttered user environment, and completely unique from any other message giving guaranteed protection to the system as a whole.

Encrypt Message Code

The code logic for the Encrypt Message process of the present invention is:

```
Message encrypt
    Read Original Key in
        OK1 = Digit #1 of key
        OK2 = Digit #2 of key
        ...
        OKn = Last Digit of key
    Generate Random Make Number
        ! RM is the returned Random Make number
        Call Random(R_M)
    Generate Source Key Number
        ! OKn is passed, R_M n is passed, S_K n returned
        ! The GetOk# function returns the next O_K number
        ! SumKey function adds two digits together and returns a
        !  MOD(10) number
        set n=1
        loop
            Call GetOk#(R_M n ,Ok#)
            Call SumKey(O_K n, Ok#, S_K n)
            SK = SK∥S_K n
            set n=n+1
            If n>KeyLength
                Break
    Encrypt R_M
        ! Set R_M ready to add to the encrypted message, after encrypting
        ! it with a "base" S_K - sR_M E is the returned R_M encrypted
        Call EncryptRm( sR_M E)
    Generate a R_K Random Key
        ! S_K n is passed, R_M n is passed, R_K n is returned, if not zero
        ! The TranslateMatrixNotZ function accepts an Input value
        ! number, a Formula value number and returns the translated
        ! matrix number
        ! set n=1
        loop
            Call TranslateMatrixNotZ(S_K n, S_K(R_M n), R_k n)
            R_K = R_K∥R_K n
            set n=n+1
            If n>KeyLength
```

-continued

```
            Break
    Generate a M_K Message Key
        ! S_Kn is passed, R_Kn is passed, M_Kn is returned
        ! The TranslateMatrix function accepts an Input value
        ! number, a Formula value number and returns the translated
        ! matrix number (even if zero)
        set n=1
        loop
            Call TranslateMatrix(S_Kn, R_Kn, M_Kn)
            M_K _ M_K,,M_Kn
            set n= n+1
            If n>KeyLength
                Break
    Set Message Alphabet
        ! Call the SetSegments sub-process to setup the msg alphabet
        Call SetSegments()
    Generate n False Characters
        ! Create a false character set by using two digits from S_K )
        ! CreateFalse generates a random number to insert into message
        FCs1 = (Digit n of SMessageKey)(Digit n+1 of SMessageKey)
        Set n = 1
        Loop
            Call CreateFalse( FCn )
            Set n = n+1
            If n > FCs1
                Break
    EncryptMessageContents
        ! now encrypt the contents...first set the alphabet w/SetSegments
        ! The FalseStartV, FalseSeparationV and FalseGroupV are all
        ! from the S_K source key for inserting false numbers - they will
        ! to be discarded as the contents are decrypted....
        Call SetSegments(M_K)
        FalseStartV = (Dgt n of SMessageKey)(Dgt n+1 of SMessageKey)
        FalseSeparationV = (Digit n of SMessageKey)
        FalseGroupV = (Digit n of SMessageKey)
        Set n=1
        Loop
            If n FalseStartV or (n – FalseStartV
                MOD(FalseSeparationV)) = 0
                Set z = 0
                Loop
                    Call Random(ECn2)
                    ECn = ECn || ECn2
                    Set z = z+1
                    If z = FalseGroupV
                        Break
            Else
                If not GetNextCharacter(Char[n])
                    Break
                Call FindSegmentMatrix(SegChar[n])
                Call FindSegmentMatrix(ColChar[n])
                If Char[n]= CapitaWetter
                    Call TranslateMatrix(M_Kn ,ShiftChar[Seg], ECn)
                    Call TranslateMatrix(M_Kn , ShiftChar[Col], ECn+1)
                    set n = n+2
                    Call TranslateMatrix(M_Kn ,ColChar[n], ECn)
                    Call TranslateMatrix(M_Kn , SegChar[n], ECn)
                    set n=n+1
            EC = EC||ECn
            ! EC is ENCRYPTED MESSAGE CONTENT ready to send....
        Digital Signature
            ! Create Digital Signature for authentication
            ! first sum the positions, then set the order from the R_M,
            ! then encrypt using the "base" S_K
            Call SumPositions(DSin)
            Call SetOrder(R_M, Dsin, DSout)
            Call EncryptDS(dsE)
                Segment Matrix Distribution Sub-Process Code
    The code logic for the Segment Matrix distribution sub-process of the
Encrypt Message process is:
    SetSegments
        Read Message Key in
            M_{K1 = Digit #1 of key}
            M_{K2 = Digit #2 of key}
            ...
            M_{Kn = Last Digit of key}
    ! n is equal to the start digit in the key where the code will begin looking   !
for a valid number to return
    Pick Alphabet Start Position
        Set n=(any number less than or equal to KeyLength – STATIC)
```

```
        Loop
            APs1 = (Digit n ofMessageKey)(Digit n+1 ofMessageKey)
            IfAPs <= 81
                Break
            n=n+1
            If n>KeyLength
                Set n=1
    Pick Blank Position Start
        Set n=(any number less than or equal to KeyLength - STATIC)
        Loop
            BPs = (Digit n ofMessageKey)(Digit n+1 ofMessageKey)
            IfBPs <= 81
                Break
            n=n+1
            If n>KeyLength
                Set n=1
    Pick Blank Separation Value
        ! This decides how far apart the blanks are
        Set n=(any number less than or equal to KeyLength - STATIC)
        Loop
            B_S = (Digit n ofMessageKey)
            IfB_S.(# of blanks in the system alphabet) <=81
                Break
            n=n+1
            If n>KeyLength
                Set n=1
    Pick Blank Group Value
        ! This decides how many blanks to group together
        Set n=(any number less than or equal to KeyLength - STATIC)
        Loop
            B_G = (Digit n ofMessageKey)
            IfB_G <=# of blanks in the system alphabet
                Break
            n=n+1
            Ifn>KeyLength
                Set n=1
    ! Then use the gathered settings to set the separation and grouping of
    ! the blanks into the alphabet; and fill a matrix array with the finished
    ! alphabet, starting with the alphabet start position
    !
    ! Segment Matrix is ready for Encryption or Decryption
```

DECRYPTION MESSAGE PROCESS

Generate Source Key $S_K$ From Original Key $O_K$

The Decrypt process is a straightforward application of the existing sub-processes against the message contents, testing the authenticity and revealing the message. The first step that must be taken is to generate a "base" Source Key $S_K$ from the Original Key $O_K$.

Decrypt First n Digits of the Message Using Source Key $S_K$

The "base" Source Key $S_K$ is used to decrypt the first n digits of the message (the key length n, is established by the two public entities using the SEMS). This will reveal the message Random Make number $R_M$.

Generate Message Source Key $S_K$, Random Key $R_K$ and Message Key $M_K$

The Random Make number $R_M$ is now available to follow the exact same steps as in the Encrypt process to create a message Source Key $S_K$, a Random Key $R_K$ and a Message Key $M_K$.

It should be pointed out that without the Original Key $O_K$, there is no "starting point" for a decrypt attack. The Random Make number $R_M$ has no "grammar" to attempt to discover the parent "base" Source Key $S_K$—there is simply no way to know what it "should" be to test against. The only "grammar" that lends itself to key attempts is the message body itself, and that leads only to discovery of the message key, if anything.

Message Authentication

The key set that is decrypted using the Original Key $O_K$ will be used to decrypt the message contents, provided the message is authentic. The "base" $S_K$ source key is used to decrypt the DS into the ordered sum of the positions; which is further decrypted back to the individual position sums of each digit using the decrypted $R_M$ random make number digit appearance order. The original message contents are position summed and then compared to the decrypted DS, and if there is a discrepancy, then the message is invalid. This can happen for several reasons including transmission errors, so one of the major benefits of the present invention is to simply re-send the message since an individual message error is insignificant, and the system as a whole is not impacted at all.

If the message is indeed valid, then the $M_K$ message key is used to decrypt the message body, after the false characters have been discarded using the $S_K$ source key.

Code for the Decrypt Process

The code logic for the Decrypt Message process of the present invention is:

```
MessageDecrypt
    Read Original Key in
        O_K1 – Digit #1 of key
        O_K2 – Digit #2 of key
        ...
        O_Kn – Last Digit of key
    Decrypt R_M
        ! Get R_M from the encrypted message by decrypting
        ! it with a "base" S_K – R_M random make number is returned
        Call DecryptRm( sRME, R_M)
    Generate Source Key Number
        ! O_Kn is passed, R_Mn is passed, S_Kn is returned
        ! The GetOk#function returns the next O_K number
        ! SumKey function adds two digits together and returns a
        !  MOD(10) number
        set n=1
        loop
            Call GetOk#(R_Mn ,Ok#)
            Call SumKey(O_Kn, Ok#, S_Kn)
            S_K = S_K‖S_Kn
            set n=n+1
            If n>KeyLength
                Break
    Generate a R_K Random Key
        ! S_Kn is passed, R_Mn is passed, R_Kn is returned, if not zero
        ! The TranslateMatrixNotZ function accepts an Input value
        ! number, a Formula value number and returns the translated
        ! matrixnumber
        set n=1
        loop
            Call TranslateMatrixNotZ(S_Kn, S_K(R_Mn), R_Kn)
            R_K=R_K‖R_Kn
            set n=n+1
            If n>KeyLength
                Break
    Generate a M_K Message Key
        ! S_Kn is passed, R_Kn is passed, M_Kn is returned
        ! The TranslateMatrix function accepts an Input value
        ! number, a Formula value number and returns the translated
        ! matrix number (even if zero)
        set n=1
        loop
            Call TranslateMatrix(S_Kn, R_Kn, M_Kn)
            M_K=M_K‖M_Kn
            set n=n+1
            If n>KeyLength
                Break
    Digital Signature
        ! Decrypt Digital Signature for authentication
        ! first decrypt using "base" source key, then compare to the
        ! DS sum in the sent message....(no need to re-evaluate the order)
        Call DSDecrypt(DSin)
        Call SumPositions(MSGin, DSTESTout)
        IfDSTESTout != DSout
            ERROR! - Message is INVALID!
            Quit()
        Else
            MSG O_K - Continue...
    Discard n False Characters
        !Find out how many false characters by using two digits from S_K)
        ! DiscardFalse removes the false random numbers from message
        FCs1 = (Digit n of SMessageKey)(Digit n+1 of SMessageKey)
        Set n = 1
        Loop
            Call DiscardFalse( FCn )
            Set n = n+1
            If n>FCs1
                Break
    DecryptMessageContents
        ! now decrypt the contents...set the alphabet w/SetSegments
        ! The FalseStartV, FalseSeparationV and FalseGroupV are all
        ! from the S_K source key for inserting false numbers - they need
        ! to be discarded as the contents are decrypted....
        Call SetSegments(M_K)
        FalseStartV = (Dgt n of SMessageKey)(Dgt n+1 of SMessageKey)
        FalseSeparationV = (Digit n of SMessageKey)
        FalseGroupV = (Digit n of SMessageKey)
        Set n=1
        Loop
            If n = FalseStartV or (n – FalseStartV
```

-continued

```
                    MOD(FalseSeparationV)) = 0
                Set z = 0
                Loop
                    Call Random(ECn2)
                    ECn = ECn||ECn2
                    Set z = z+1
                    If z = FalseGroupV
                        Break
        Else
            If not GetNextCharacter(Char[n])
                Break
                Call FindSegmentMatrix(SegChar[n])
                Call FindSegmentMatrix(ColChar[n])
                If Char[n]= CapitalLetter
                    Call TranslateMatrix(M_Kn , ShiftChar[Seg], DCn)
                    Call TranslateMatrix(M_Kn ,ShiftChar[Col], DCn+1)
                    set n = n+2
                Call TranslateMatrix(M_Kn , SegChar[n], DCn)
                Call TranslateMatrix(M_Kn ,ColChar[n], DCn)
                set n=n+1
    DC = DC || Dcn
    ! MESSAGE CONTENT is DC...
```

EXAMPLE

The following is an example to clarify the secure messaging key system:

Encryption

Step 1—Parties Agree on Original Key $O_K$

COMPANY_A and PERSON_B are two public entities who wish to send secure messages to each other. The first step for these two entities is to agree on the original key that will be used to secure the messages. The Original Key $O_K$ to be used for their messaging is "8507734814".

Step 2—Generate "Base" Source Key $S_K$

This key generates a "base" $S_K$ source key (digit order) of "37025" (8+5 MOD(10)=3, 0+7 MOD(10)=7, 7+3 MOD(10)=0, 4+8 MOD(10)=2 and 1+4 MOD(10)=5).

Step 3—Create Random Make Number $R_M$

PERSON_B wishes to send the following message to COMPANY_A: "Hello there!" (message does not include the quotes). The SEMS will be used to secure the message, and the first step is to create the Random Make number $R_M$ of equal length to the length of the Original Key $O_K$. The Random Make number $R_M$ is generated by a random number generation process, and for this message, the number is "2039173064".

Step 4—Generate Source Key $S_K$

Next the SEMS will generate the "key suite" of the $S_K$ source key, the $R_K$ random key and the $M_K$ message key. These values use the SEMTS encryption matrix listed elsewhere in the detailed section of this document.

The Source Key $S_K$ uses the first five digits of the Random Make number $R_M$ "20391" and the entire Original Key $O_K$ to become "82575". This is created by taking the "8" first digit of the Original Key $O_K$ and looking two digits to the right (from the number "2" in the $R_M$ random make number) and summing those numbers ("8"+"0"), the resulting number is "8". Since the Original Key $O_K$ digits are used only once to create the $S_K$ source key of half the length, the used digits are tracked.

To create the next digit of the $S_K$, the next unused digit ("5") of the $O_K$ is summed with the "7" of the Original Key $O_K$. The "7" is arrived at by using the "0" from the $R_M$ random make number, which is used to look up the tenth digit of the Original Key $O_K$. Since the tenth digit falls off the end, then it cycles back to the start. When counting digits in the "pull" from the key, all the digits are counted, whether used or not. The tenth digit returns back to the same "5" that is being used for this creation, which is not available, so now the process will move one digit to the right and see if this is available. If not, the process will continue to move one digit at a time until finding a digit that has not been used. In this case, the next digit after the "5" is the already used "0", so moving one to the right places the "7" into the equation, 5+7 (MOD10)=2. So now the $S_K$ source key creation so far is "82".

The next Original Key $O_K$ digit to use in the source key creation process is the fifth digit, "7". Taking the "3" from the $R_M$ random make number to find the pull from the Original Key $O_K$, yields the equation 7+8 (MOD10)="5", the next digit of the $S_K$ Continuing, the next available digit of the $O_K$ is "3". The pull uses the "9" from the $R_M$ random make number, and after cycling back to the start of the key, and pulling each digit until finding an available one, the formula is 3+4 (MOD10)="7", the fourth digit of the $S_K$ source key. Lastly, the next available digit of the $O_K$ is "1", and the $R_M$ random make pull is a "1", but since these are the last digit pairs, the pull is insignificant—the "4" from the $O_K$ will be paired with the "1". 1+4 (MOD 10)="5", the last digit of the "82575" $S_K$ source key.

Step 5—Encrypt Random Make Number $R_M$

The next step in the SEMS process to send PERSON_B's secure message is to encrypt the $R_M$ random make number and ready it for inclusion in the message. The $R_M$ random make digits are passed through the SEMTS encryption matrix as input values and the "base" $S_K$ source key digits are used as the formula values (zero's are treated by the SEMTS as random inserts—making derivation of the $R_M$ random make impossible without the original key). The resulting $R_ME$ random make encrypted number will be sent as the first n digits of the message. (This step can occur anywhere in the process provided it is prior to formatting and sending the message.)

Using matching digit positions, the encryption matrix pairs are [2,3], [0,7], [3,0] (which is a random insert because the formula value in the SEMTS cannot be a "0", so the next "base" $S_K$ source key digit is used—[3,2]), [9,5], [1,3], [7,7], [3,0] (another formula "0", so use the "2", [3,2]), [0,5], [6,3], [4,7] where the 2,0,3,9,1,7,3,0,6,4 come from the Random Make number $R_M$ and the 3,7,0,2,5 come from the "base" Source Key $S_K$. The Encrypted Random Make number $R_ME$ result out of the SEMTS encryption matrix is "578544415591" where the third and eighth digits, "8" and "1" are random inserts. On decryption of the message, since the "base" $S_K$ source key is a known entity derived directly from the Original Key $O_K$, the random inserts into the $R_M$ random make will be discarded.

Step 6—Create Random Key $R_K$

The next key derivative to create in the message suite is the $R_K$ random key. This key uses the just created Source Key $S_K$ and the Random Make number $R_M$ in a slightly different manner than the previous pull from the Original Key $O_K$. In this pull, a "0" is used as a 0, not a 10; the Source Key $S_K$ numbers can be reused, and when cycling around the edge of the key, when landing on the number already being used for the key generation, it can be used as the formula value also. Also, these number pairs are not added, but are passed through the SEMTS encryption matrix to return a value.

The first digit of the Source Key $S_K$ is an "8", and using the first digit of the $R_M$ random make number, "2", that creates an input value of "8" and a formula value of "5" to be passed through the matrix. The result, the first digit of the $R_K$ random key, is a "3". In creating the $R_K$ random key, the rule of never returning a zero must be enforced. Continuing, the next digit of the $S_K$ is "2" and the $R_M$ random make is a "0", so the digit pair to pass through the matrix is [2,2], yielding a result of "4". The next digit pair is [5,8], the five coming from the $S_K$ and the "8" being the third digit to the right, after cycling back to the start. (The third digit lookup comes from the "3" in the Random Make number $R_M$.) The last two digit pairs are [7,5] and [5,8], which when passed through the encryption matrix yield a "2" and a "3" respectively. The final Random Key $R_K$ is "34323".

Step 7—Generate Message Key $M_K$

The last key to generate in the message key suite is the Message Key $M_K$ that will be used to encrypt the contents. In order for this key to be as far removed from the Original Key $O_K$ as possible, it is created as an encryption matrix pass through using the $S_K$ source key as the input values and the $R_K$ random key as the formula values. Using matching digit positions, the encryption matrix pairs are [8,3], [2,4], [5,3], [7,2], and [5,3], where the 8,2,5,7,5 come from the Source Key $S_K$ and the 3,4,3,2,3 come from the Random Key $R_K$. The $M_K$ message key result out of the SEMTS encryption matrix is "16898".

Step 8—Distribute Alphabet Into the Alphabet Order Segment Matrix

Now that the message key suite has been created, the next step is to distribute the alphabet into the Alphabet Order Segment Matrix. This is accomplished on a per message basis from an agreed upon "master" order of the occurrence of each alphabet member. For this example message, the order of the alphabet will be as listed in the Example matrix earlier in this document. This alphabet has nine (9) blank spaces in it, and in order to distribute it for this individual message, some static Message Key $M_K$ digit positions are used. These static positions are agreed upon for all users of the system, including COMPANY_A and PERSON_B.

There are four offset numbers required to set the segments: 1. The start position for the alphabet fill, 2. the start position of the blank fill, 3. the blank separation value, and 4. the blank group value. For this example, the four numbers will be created from $M_K$ digits 2 and 5, digits 1 and 2, digit 5 and digit 1; yielding numbers "68", "16", "8" and "1". Using these offsets, and the given alphabet order, the Segment Matrix has the following distribution:

Alphabet Order Segment Matrix for Message

| Column Segment | 1 | 2 | 3 | 4 | 5 | 6 | 7 | 8 | 9 |
|---|---|---|---|---|---|---|---|---|---|
|   |   |   |   |   | Position |   |   |   |   |
| 1 | – | # | T | b | ? | \| | K | + | Q |
| 2 | : | 3 | & | b | N | , | " | B | / |
| 3 | R | shift | X | b | 4 | ' | ' | G | ! |
| 4 | O | 9 | W | b | V | ) | $ | { | ] |
| 5 | Y | I | M | b | . | 1 | ; | 5 | P |
| 6 | < | A | U | b | = | CR | LF | C | _ |
| 7 | S | F |   | b | 6 | 8 | L | * | 0 |
| 8 | } | H | @ | b | D | E | \ | SP | ~ |
| 9 | C | Z | [ | b | 2 | % | J | < | 7 |

Step 9—Insert False Characters at Beginning of Message

Now that the alphabet is distributed, then the next encryption step is to insert a set of false characters into the message contents so that each key attempt of a brute force attack on the message must test a wide range of start positions for the real message contents. The manner in which this is done is to pick two system predetermined static digit positions from the $S_K$ source key and then use the values at those digits to represent the number of false digits. For example, in this example the digits will be the second digit (which happens to contain a "2") and the fifth digit (which also coincidentally happens to contain a "5") producing a value of "25". This means that the encrypted contents will have 25 random numbers inserted into the contents string of encrypted numbers prior to the real start of the message. (If the second digit was a "9" and the fifth digit was a "1", then 91 false digits would have been generated.).

Step 10—Encrypt Message Contents

Next, is the actual message contents encryption. To review so far, the SEMS has the following information ready for this message:

| Message Contents | Hello there! |
|---|---|
| Original Key $O_K$ | 8507734814 |
| "Base" 5K source key | 37025 |
| $R_M$ random make number | 2039173064 |
| $S_K$ source key | 82575 |
| $R_K$ random key | 34323 |
| $M_K$ message key | 16898 |
| $R_M E$, the encrypted $R_M$ random make number | 578544415591 |
| 25 digit false character string | 3928049281740572937459183 |

The message encryption is a straightforward use of the SEMTS encryption matrix using the Message Key $M_K$ in sequence as each input value; and inserting the false encryption numbers during the process. Each formula value is first the alphabet segment of the message character and then the alphabet row of that character. If the character is a capital letter, then the segment and row of the "shift" character is entered first, then the letter segment and row. To encrypt PERSON_B's message, the following is the sequence. The brackets are the pair of digits to send into the encryption matrix, with the input value first, then the formula:

shift segment [1,3] yields encrypted result "4"
shift column [6,2] yields "8"
H segment [8,8] yields "6"
H column [9,2] yields "1"
e segment [8,8] yields "6"
e column [1,6] yields "7"
1 segment [6,7] yields "3"
1 column [8,7] yields "5"
1 segment [9,7] yields "6"

1 column [8,7] yields "5"
o segment [1,4] yields "5"
o column [6,1] yields "7"
space segment [8,8] yields "6"
space column [9,8] yields "7"
Completing the remainder of the message "there!" is made up of bracket pairs [8,1], [1,3], [6,8], [8,2], [9,8], [8,6], [1,3], [6,1], [8,8], [9,6], [8,3], [1,9]. The encrypted translation matrix output for these yields "944074476510". All together, the encrypted message contents output reads "4861673565576794407441476510."

Step 11—Insert False Encryption Numbers Inside Message

In order to insert the false encryption numbers, the $S_K$ source key is used. There are three positions that must be chosen to insert the false characters—a start value, a separation value and a group value. These can be either one or two digits long (or longer), and are chosen at a system level for the SEMS to be used by all message participants. For our example, the false start value will be position 3 of the $S_K$ source key, the false separation value will be position 4 and the false group value will be position 2. These positions yield a start of "5", a separation of "7" and a group of "2". So the encrypted message contents will now be seeded with a false random number group of two digits every seven numbers starting on the fifth position. The encrypted message contents will now be:

"4861 90 673565 52 576794 11 407447 85 6510"

where the spaces are for emphasis and the "90", "52", "11" and "85" are the false digit pairs that will be discarded in the decryption process.

The total encrypted message output so far is made up of the $R_ME$, the encrypted $R_M$ random make number, then the 25 false characters, then the encrypted message contents. This yields:

57854441559139280492817405729374591834861906735655257679411407447856510

In this case, the underlined characters represent false characters that will be discarded during the decryption process.

Step 12—Create Digital Signature

The final process in the message send is now the authentication string, or "Digital Signature". This is created by summing the position values of all of the digits used in the message up to now. This yield is:

The number 1 summed position value total=8+12+22+35+ 41+58+59+70=305
The number 2 summed position value total=15+20+28+51= 114
The number 3 total=126
The number 4 total=374
The number 5 total=417
The number 6 total=254
The number 7 total=363
The number 8 total=181
The number 9 total=205
The number 0 total=217

The numbers do sum to the total of the 71 digits, which is 2556. In order to place the DS into the message, it is first ordered by the first occurrence (i.e., appearance) of the digits in the $R_M$ random make number, 2039173064: 114 217 126 205 305 363 254 374 (The spaces are there for demonstration).

The numbers that do not appear in the $R_M$ random make number are 5 and 8, and these are added from low to high; the final order for the DS is:

114217126205305363254374417181.

Step 13—Encryption of the Digital Signature

The DS will now be encrypted and appended to the message. In order to secure the DS from the message contents, the $S_K$ source key of 82575, will be used to encrypt it. The DS is passed through the SEMTS encryption matrix using the $S_K$ source key in sequence. The numbers are pulled just like the message contents first by segment and then column. The resulting bracket pairs are:

The number 1 segment [8,5] yields "3"
The number 1 column [2,6] yields "8"
The number 1 segment [5,5] yields "0"
The number 1 column [7,6] yields "3"
The number 4 segment [5,3] yields "8"
The number 4 column [8,4] yields "2"
The number 1 segment [7,5] yields "2"
The number 1 column [5,6] yields "1"

The final encrypted sequence for the DS is:

"380382192171034299695105709423042170192316794759093846049121"

Now all of the encryption is complete for the message in total, and the final format to send is (including the carriage return, line feed between the first contents seqence and the DS sequence):

"57854441559139280492817405729374591834861906735655257679411407447856 510
380382192171034299695105709423042170192316794759093846049121"

It should be noted that whereas this encrypted message is large compared to the small size of the message, the formatting has a minimum size of the $R_ME$ encrypted random make number, all of the false digits, and the DS—which increases in size at a much smaller rate than the message size. So after the minimum message formatting, the encrypted message is roughly twice the size of the original message, and the longer the message, the closer it is to that ratio.

Decryption

Step 1—Applying "Base" Source Key $S_K$ to the First n Digits of Message

The decryption process for COMPANY_A to decipher the message is a simple application of the same key creation after reading in the $R_ME$ encrypted random make number and applying the Original Key $O_K$. The known values at the start of a decryption are the Original Key $O_K$ and the "base" $S_K$ source key. Decryption begins by applying the "base" $S_K$ source key to the first n digits of the message, e.g., the $R_ME$ encrypted random make number. In this example, n is equal to 12 digits—but the process knows to return the first 10 real digits, which is the length of the Original Key $O_K$ and the therefore the $R_M$ random make number. For all of the decryption processes, a "reverse" SEMTS encryption matrix (function) is created to return the original input value based on the known function and the known "return" value that is being passed in "backwards."

To gather the $R_M$ random make number, the decryption process starts with the first digit of the encrypted message, "5". Using the known "base" $S_K$ source key 37025, the "reverse" SEMTS function is called with its first digit "3" and the "5". The "reverse" SEMTS encryption matrix looks in the third formula row for a return value of "5". The input value for that is a "2", the first digit of the Random Make number $R_M$. Continuing this process, the second message digit is a "7" and the $S_K$ source key second digit is a "7" also. In the seventh formula row, a "7" return value is generated by an input value of "0", the second Random Make number $R_M$. The third message digit, "8" is paired with the third $S_K$ source key digit, "0". Now since there is no formula row for a "0", the message digit is a known random insert and it is discarded. The next message digit, "5" is paired with the $S_K$ digit "2". The third digit in the Random Make number $R_M$ is therefore a "3". This process continues until there is the full compliment of n key digits returned. In our example, n=10, and it will take twelve message digits to return those ten. The decryption process now knows the Random Make number $R_M$, 2039173064.

Step 2—Use $R_M$ to Derive $S_K$, $R_K$ and $M_K$

The $R_M$ is used to derive and decrypt the remaining keys—the Source Key $S_K$, the Random Key $R_K$ and the Message Key $M_K$. This is accomplished identically as it is in the encryption process, as COMPANY_A now has the same "start" knowledge for this message as PERSON_B did when encrypting it: the Original Key $O_K$ and the "base" Source Key $S_K$ are shared, and now the Random Make number $R_M$ is known. From these, the same processes that derived the "key suite" during encryption is performed, and now COMPANY_A is ready to determine if the message is genuine.

Step 3—Authentication a) Decrypting Digital Signature Using Source Key $S_K$

The process of content and sender verification begins by decrypting the message Digital Signature with the Source Key $S_K$. This is done using the SEMTS "reverse" matrix with the known values being the result and the input. Passings all of the message encrypted DS numbers through will yield the segment and column values for the real DS numbers as they appear in the alphabet matrix.

b) Generate DS for Current Message and Compare with Decrypted DS

Once the numbers are determined and that string is realized, then the current message's encrypted content is processed for a DS. If the two DS strings do not match (they are both in the Random Make number $R_M$ order), then either the message or the DS has been touched. A request would be sent to the sender, PERSON_B, for re-submission of the message, which is then again, uniquely encrypted. There is no cause to change the Original Key $O_K$ as there is no way to derive it from any touched message; and as to the remainder of the physical procedures for security on the delivery of messages, each SEMS implementation will need to handle these individually.

Sender verification is inherent in the "key suite" set for any individual message—if the Random Make number $R_M$ that is derived as the first step in the decryption process leads to a key suite that does not return the message to a readable or expected content, then the message could not have been generated using the expected Original Key $O_K$ for PERSON_B. To handle multiple messages from multiple senders, COMPANY_A would simply institute a system of account numbers that can be placed as a header in any SEMS encrypted message. The account number then points to an Original Key $O_K$ that is used as the basis for decrypting the enclosed message. If the account number Original Key $O_K$ does not open the message, then the message is not valid, and could not be from the designated sender.

Step 4—Distribute Master Alphabet into Alphabet Order Segment Matrix

Once the message is properly authenticated, the decryption process next uses the Message Key $M_K$ to distribute the master alphabet into the Alphabet Order Segment Matrix for this message.

Step 5—Removal of False Characters

Then the message key suite is used to remove the 25 false character offset.

Step 6—Decryption of Remaining Encrypted Numbers

Next, each remaining encrypted number is sent through the "reverse" SEMTS matrix with the known values being the result and the Message Key $N_K$, being the input value.

The number is only sent through if the digit is not a false number digit inserted by the start, separation and group values returned from the Source Key $S_K$. Based on these static digit positions, if the number is false it is discarded, and if not, it is decrypted. The static values for our example are a false start value from position 3 of the Source Key $S_K$, the false separation value from position 4 and the false group value from position 2. These positions yield a start of "5", a separation of "7" and a group of"2".

If the number is passed through the "reverse" matrix, the formula value is returned, and this is the segment value for the first message character. The second number passed through will yield the column value, and these two together will determine the message character based on the message dependent alphabet matrix. If the character is the "shift" entry, then the next two non-false number returns will be the letter to capitalize.

This process is continued until all of the message content numbers are decrypted. When complete, COMPANY_A will have deciphered PERSON_B's "Hello there!" message.

What is claimed is:

1. A method for encrypting a message comprising the steps of:
    a) calculating a numerical value corresponding to each digit of a source key by using said each digit of the source key as an input variable to one of a first plurality of formulae, thereby creating a message key;
    b) selecting said one of the first plurality of formulae in step a) based on a corresponding digit of a random key; and
    c) distributing an alphabet of characters throughout a predetermined matrix for each individual message based on the message key by:
        (i) determining an order fill pattern for the alphabet;
        (ii) determining a start position of an alphabet fill in the matrix from two predetermined digits of the message key;
        (iii) determining a start position of a blank fill from two additional predetermined digits of the message key;
        (iv) determining a blank separation value from two more predetermined digits of the message key;
        (v) determining a blank grouping value from two further predetermined digits of the message key;
        (vi) designating a plurality of blank positions in the matrix starting at a position in the matrix equal to a modular sum of the start position of the alphabet fill plus the start position of the blank fill, continuing for a number of positions in the matrix equal to the blank grouping value, and then skipping a number of positions in the matrix equal to the blank grouping value; and
        (vii) distributing the alphabet in the matrix by starting at the start position of the alphabet fill and filling all positions not designated as blank positions according to the order fill pattern.

2. A method for encrypting a message comprising the steps of:
    a) calculating a numerical value corresponding to each digit of a source key by using said each digit of the source key as an input variable to one of a first plurality of formulae, thereby creating a message key;
    b) selecting said one of the first plurality of formulae in step a) based on a corresponding digit of a random key;
    c) distributing an alphabet of characters throughout a predetermined matrix for each individual message based on the message key;

d) calculating a numerical value corresponding to each digit of the source key by using said each digit of the source key as an input variable to one of a second plurality of formulae, thereby creating the random key; and e) selecting said one of the second plurality of formulae in step d) based on a second digit of the source key that is cyclically offset from said each digit in step d) in accordance with a random number.

3. The method according to claim 2, wherein the step e) of selecting further comprises the substeps of:

(i) using a digit of the random number corresponding to said each digit of the source key to determine a cyclical positional offset from said each digit of the source key;

(ii) determining said second digit of the source key in step e) by cyclically moving a number of digits from said each digit of the source key in accordance with the cyclical positional offset; and (iii) selecting another one of said second plurality of formulae based on a third digit of the source key that is offset from said second digit of the source key by a predetermined amount if said one of the second plurality of formulae in step e) returns a value of zero.

4. A method for encrypting a message comprising the steps of:

a) calculating a numerical value corresponding to each digit of a source key by using said each digit of the source key as an input variable to one of a first plurality of formulae, thereby creating a message key;

b) selecting said one of the first plurality of formulae in step a) based on a corresponding digit of a random key;

c) distributing an alphabet of characters throughout a predetermined matrix for each individual message based on the message key;

d) calculating a numerical value corresponding to each character of the message by cyclically using a corresponding digit of the message key as an input variable to one of a second plurality of formulae, thereby creating an encrypted message; and e) selecting said one of the second plurality of formulae based on a location in the matrix in which said each character in step d) is stored.

5. A method for encrypting a message comprising the steps of:

a) calculating a numerical value corresponding to each digit of a source key by using said each digit of the source key as an input variable to one of a first plurality of formulae, thereby creating a message key;

b) selecting said one of the first plurality of formulae in step a) based on a corresponding digit of a random key;

c) distributing an alphabet of characters throughout a predetermined matrix for each individual message based on the message key d) calculating two numerical values corresponding to each character of the message by cyclically using two corresponding digits of the message key as input variables to a first one of a second plurality of formulae and a second one of said second plurality of formulae, respectively, thereby creating an encrypted message;

e) selecting said first one of the second plurality of formulae based on a column in the matrix in which said each character in step d) is stored; and f) selecting said second one of the second plurality of formulae based on a row in the matrix in which said each character in step d) is stored.

6. A method for encrypting a message comprising the steps of:

a) calculating a numerical value corresponding to each digit of a source key by using said each digit of the source key as an input variable to one of a first plurality of formulae, thereby creating a message key;

b) selecting said one of the first plurality of formulae in step a) based on a corresponding digit of a random key;

c) distributing an alphabet of characters throughout a predetermined matrix for each individual message based on the message key;

d) modular summing pairs of digits of an original key according to a random number assignment of the pairs of digits of the original key to produce said source key, which has a length less than that of the original key.

7. The method according to claim 6, wherein the step d) of modular summing further comprises the substeps of:

(i) pairing a first digit of the original key with a second digit of the original key, wherein the second digit is offset from the first digit by a first cyclical offset amount;

(ii) determining a first cyclical offset amount based on a digit of the random number corresponding in position to a position of the first digit; and (iii) selecting a next unused digit in the original key if the second digit paired in step (i) has already been paired with another digit of the original key.

8. The method according to claim 4, further comprising the step of:

f) determining a number n by selecting predetermined digits of the source key; and g) inserting a plurality n of false characters at a beginning of the encrypted message for each message.

9. The method according to claim 4, further comprising the step of:

f) interspersing a plurality of false characters throughout the encrypted message.

10. The method according to claim 9, further comprising the step of:

g) determining a starting position, a separation value and a grouping value of the false characters using predetermined digits of the source key.

11. The method according to claim 4, further comprising the step of:

f) appending an encrypted digital signature to each encrypted message that is completely unique and individual for each message that authenticates both a sender and content of the message as genuine.

12. The method according to claim 11, further comprising the step of:

g) determining a digital signature based on manipulating digits of the encrypted message in accordance with a predetermined algorithm.

13. The method according to claim 12, wherein the predetermined algorithm comprises the steps of:

(i) summing all position values for each integer from zero through nine used in the encrypted message;

(ii) concatenating a resulting sum for each integer in order according to an order in which said each integer first appears in a random number; and (iii) using a lowest to highest ordering for those integers that do not appear at all in said random number.

14. The method according to claim 12, further comprising the step of:

h) encrypting each digit of the digital signature by cyclically using each digit of the source key as an input variable to one of a third plurality of formulae; and i) selecting said one of the third plurality of formulae in accordance with a location of said each digit of the digital signature in said matrix.

15. The method according to claim 12, further comprising the step of:

h) encrypting each digit of the digital signature by cyclically using two digits of the source key as input variables to a first one of a third plurality of formulae and a second one of a third plurality of formulae, respectively;

i) selecting said first one of the third plurality of formulae in accordance with a column in the matrix in which said each digit of the digital signature is located; and j) selecting said second one of the third plurality of formulae in accordance with a row in the matrix in which said each digit of the digital signature is located.

16. The method according to claim 2, further comprising the steps of:

f) encrypting each digit of the random number by using said each digit of the random number as an input variable to one of a third plurality of formulae;

g) selecting said one of the third plurality of formulae in accordance with a cyclically corresponding digit of a base source key; and h) transmitting the encrypted random number as part of the encrypted message.

17. The method according to claim 16, wherein the step g) of selecting further comprises the substeps of:

(i) inserting a random digit in the encrypted random number when said cyclically corresponding digit of the base source key equals zero; and (ii) using a next digit in the base source key to select said one of the third plurality of formulae when said cyclically corresponding digit of the base source key equals zero.

18. The method according to claim 16, further comprising the steps of:

i) pairing predetermined digits of the original key; and j) modular summing the paired digits of the original key to obtain the base source key.

19. A secure electronic messaging system comprising the steps of:

a) assigning to two distinct public entities, two identical original symmetric numeric keys of length n where n is an even number and of set length so that $1 \times 10^{n/2}$ is a substantial and agreed upon number;

b) using a random number to assign and sum the digits of the original key by a formula that produces a source key one half a length of the original key;

c) using a formula to assign and sum the digits of the original key as they appear in order in pairs to produce a base source key that is one half the length of the original key;

d) using a first plurality of formulae and the base source key to encrypt the random number and add a resulting encrypted random number to a message contents;

e) using a first formula to sum a plurality of digits of the source key to generate a random key;

f) using a second plurality of formulae to generate a unique and individual message key from the random key and the source key;

g) distributing up to an 81 character master alphabet into a 9 by 9 segment matrix uniquely for each individual message based on the message key;

h) distributing an offset of a plurality of false characters uniquely for each message based on the source key and adding these to the message contents;

i) encrypting the original message while distributing interspersed false characters by using a third plurality of formulae and based on the message and source keys;

j) using a second formula to create a message signature that is completely unique and individual for each message that authenticates both the sender and the content of the message as genuine;

k) encrypting the message signature by a fourth plurality of formulae and adding it to the message contents; and l) formatting for open public transmission a resulting total encrypted message including the encrypted random number, the false character offset, the message content with interspersed false characters and the message signature to be plain ASCII text consisting of two strings of numbers separated by a carriage return and line feed.

20. A method for decrypting an encrypted message comprising the steps of:

a) using a message key to uniquely distribute an alphabet into a matrix for the encrypted message;

b) determining a location value of a character in the matrix by using a digit of the message key as an input variable to a first plurality of formulae, and using a corresponding digit of the encrypted message as a return value of the first plurality of formulae, thereby identifying which one of the first plurality of formulae was used to generate the corresponding digit of the encrypted message, wherein a numerical order of said one of the first plurality of formulae represents said location value; and c) outputting a character in the matrix at said location value determined in said step b), thereby outputting a decrypted message.

21. The method according to claim 20, wherein the step a) of using a message key to uniquely distribute the alphabet comprises the substeps of:

(i) using a predetermined order fill pattern for the alphabet;

(ii) determining a start position of an alphabet fill in the matrix from two predetermined digits of the message key;

(iii) determining a start position of a blank fill from two additional predetermined digits of the message key;

(iv) determining a blank separation value from two more predetermined digits of the message key;

(v) determining a blank grouping value from two further predetermined digits of the message key;

(vi) designating a plurality of blank positions in the matrix starting at a position in the matrix equal to a modular sum of the start position of the alphabet fill plus the start position of the blank fill, continuing for a number of positions in the matrix equal to the blank grouping value, and then skipping a number of positions in the matrix equal to the blank grouping value; and (vii) distributing the alphabet in the matrix by starting at the start position of the alphabet fill and filling all positions not designated as blank positions according to the order fill pattern.

22. The method according to claim 20, wherein the step b) of determining a location value further comprises the substeps of:
  (i) determining a column value of the character in the matrix by using a first digit of the message key as an input variable to a first plurality of formulae, and using a first corresponding digit of the encrypted message as a return value of the first plurality of formulae, thereby identifying which one of the first plurality of formulae was used to generate the first corresponding digit of the encrypted message, wherein a numerical order of said one of the first plurality of formulae represents said column value; and
  (ii) determining a row value of the character in the matrix by using a second digit of the message key as an input variable to a first plurality of formulae, and using a second corresponding digit of the encrypted message as a return value of the first plurality of formulae, thereby identifying which one of the first plurality of formulae was used to generate the second corresponding digit of the encrypted message, wherein a numerical order of said one of the first plurality of formulae represents said column value.

23. The method according to claim 20, further comprising the step of:
  d) generating the message key from the encrypted message and an original key.

24. The method according to claim 20, further comprising the steps of:
  d) calculating a numerical value corresponding to each digit of a source key using said each digit of the source key as an input variable to one of a second plurality of formulae, thereby creating the message key; and
  e) selecting said one of the second plurality of formulae in step d) based on a corresponding digit of a random key.

25. The method according to claim 24, further comprising the steps of:
  f) calculating a numerical value corresponding to each digit of the source key by using said each digit of the source key as an input variable to one of a third plurality of formulae, thereby creating the random key; and
  g) selecting said one of the third plurality of formulae in step f) based on a digit of the source key that is offset from said each digit in step f) in accordance with a random number.

26. The method according to claim 25, further comprising the step of:
  h) summing pairs of digits of the original key according to a predetermined assignment of the pairs of digits of the original key to produce a base source key, which has a length less than that of the original key;
  i) using each digit of the base source key as an input variable to one of a fourth plurality of formulae;
  j) using a corresponding predetermined digit in a predetermined location within the encrypted message as a return value from said fourth plurality of formulae for each digit of the base source key, thereby identifying which one of the fourth plurality of formulae was used to generate said corresponding predetermined digit; and
  k) determining each digit of the random number from a formula number corresponding to said one of the fourth plurality of formulae that was used to generate the corresponding predetermined digit.

27. The method according to claim 25, further comprising the step of:
  h) generating the source key by summing pairs of digits of the original key based on pair assignments obtained in a predetermined manner from a random number.

28. The method according to claim 24, further comprising the step of:
  f) generating each digit of the random key by using each digit of the source key as an input variable to one of a third plurality of formulae; and
  g) selecting said one of the third plurality of formulae based a first offset digit of the source key that is offset from said each digit of the source key in accordance with a predetermined digit of the random number.

29. The method according to claim 28, further comprising the step of:
  h) selecting another one of said third plurality of formulae based on a second offset digit of the source key that is offset from said first offset digit of the source key by a predetermined amount of digits if said one of the third plurality of formulae in step g) returns a value of zero.

30. The method according to claim 27, further comprising the step of:
  i) determining a number n by selecting predetermined digits of the source key; and
  j) discarding a plurality n of false characters at a beginning of the encrypted message for each message.

31. The method according to claim 27, further comprising the step of:
  f) discarding a plurality of false characters interspersed throughout the encrypted message.

32. The method according to claim 31, further comprising the step of:
  g) determining a starting position, a separation value and a grouping value of the plurality of false characters using predetermined digits of the source key.

33. The method according to claim 20, further comprising the step of
  d) checking an encrypted digital signature appended to each encrypted message to determine if the message is authentic.

34. The method according to claim 33, further comprising the step of:
  e) decrypting each digit of the encrypted digital signature to obtain a decrypted digital signature by the substeps of:
    (i) using a corresponding digit of a source key as an input variable to a second plurality of formulae;
    (ii) using said each digit of the encrypted digital signature as a return value of the second plurality of formulae, thereby identifying which one of the second plurality of formulae was used to generate said each digit of the encrypted digital signature;
    (iii) using a numerical order of said one of the second plurality of formulae identified in step (ii) as a location value in said matrix; and
    (iv) outputting a character stored in said location in said matrix.

35. The method according to claim 33, further comprising the step of
  e) decrypting the encrypted digital signature by decrypting each pair of digits of the encrypted digital signature according to the substeps of:
    (i) using two corresponding digits of a source key as input variables to a second plurality of formulae;

(ii) using a first digit of said each pair of digits of the encrypted digital signature as a first return value of the second plurality of formulae, thereby identifying a first one of the second plurality of formulae that was used to generate said first digit of said each pair of digits of the encrypted digital signature;

(iii) using a numerical order of said first one of the second plurality of formulae identified in step (ii) as a row value in said matrix; and (iv) using a second digit of said each pair of digits of the encrypted digital signature as a second return value of the second plurality of formulae, thereby identifying a second one of the second plurality of formulae that was used to generate said second digit of said each pair of digits of the encrypted digital signature;

(v) using a numerical order of said second one of the second plurality of formulae identified in step (iii) as a column value in said matrix; and (vi) outputting a character located at a column and a row of said matrix according to said column and row values, respectively.

36. The method according to claim 34, further comprising the steps of:

f) manipulating digits of the encrypted digital message in accordance with a predetermined algorithm to obtain a recipient generated digital signature; and g) comparing the recipient generated digital signature with the decrypted digital signature.

37. The method according to claim 36, wherein the predetermined algorithm comprises the steps of:

(i) summing all position values for each integer from zero through nine used in the encrypted message;

(ii) concatenating a resulting sum for each integer in order according to an order in which said each integer first appears in a random number; and (iii) using a lowest to highest ordering for those integers that do not appear at all in said random number.

* * * * *